(12) United States Patent
Banta

(10) Patent No.: US 10,585,011 B2
(45) Date of Patent: Mar. 10, 2020

(54) SUMP PUMP TRACKING DEVICE

(71) Applicant: SUMPTRACKER, LLC, Elmhurst, IL (US)

(72) Inventor: John Banta, Elmhurst, IL (US)

(73) Assignee: Sumptracker, LLC, Elmhurst, IL (US)

( * ) Notice: Subject to any disclaimer, the term of this patent is extended or adjusted under 35 U.S.C. 154(b) by 113 days.

(21) Appl. No.: 15/652,228

(22) Filed: Jul. 17, 2017

(65) Prior Publication Data

US 2018/0017459 A1 Jan. 18, 2018

Related U.S. Application Data

(60) Provisional application No. 62/363,027, filed on Jul. 15, 2016.

(51) Int. Cl.
| | |
|---|---|
| G01L 13/00 | (2006.01) |
| G01L 19/12 | (2006.01) |
| F04B 51/00 | (2006.01) |
| F04F 1/18 | (2006.01) |
| F04B 49/08 | (2006.01) |
| F04B 47/00 | (2006.01) |
| F04F 1/20 | (2006.01) |
| F16K 15/00 | (2006.01) |

(52) U.S. Cl.
CPC .............. *G01L 19/12* (2013.01); *F04B 47/00* (2013.01); *F04B 49/08* (2013.01); *F04B 51/00* (2013.01); *F04F 1/18* (2013.01); *F04F 1/20* (2013.01); *G01L 13/00* (2013.01); *F16K 15/00* (2013.01)

(58) Field of Classification Search
CPC .......... G01L 13/00; G01L 19/12; F16K 15/00; F04B 51/00; F04B 47/00; F04B 49/08; F04F 1/18; F04F 1/20
See application file for complete search history.

(56) References Cited

U.S. PATENT DOCUMENTS

| | | | | |
|---|---|---|---|---|
| 3,671,954 A | * | 6/1972 | Clay | ................ B63B 39/12 114/269 |
| 3,941,507 A | * | 3/1976 | Niedermeyer | ........ F04B 49/025 417/2 |
| 3,972,647 A | * | 8/1976 | Niedermeyer | ........ F04B 49/025 417/2 |
| 4,087,204 A | * | 5/1978 | Niedermeyer | ........ F04B 49/025 417/17 |

(Continued)

*Primary Examiner* — David J Bolduc
(74) *Attorney, Agent, or Firm* — Richards Patent Law P.C.

(57) ABSTRACT

A sump pump tracking system includes a pressure sensor including a first port and a second port, a tube extending from the first port, a processor in communication with the pressure sensor, a remote server in communication with the pressure sensor, and a memory in communication with the processor. The memory includes instructions, that when executed by the processor, cause the processor to: receive a water pressure reading from the first port; calculate a corresponding air pressure from the water pressure reading from the first port; and determine the pressure differential between the first port and the second port. The server is configured to be programmed with an alarm threshold limit. The pressure sensor communicates the pressure differentials to the server. The server is configured to compare the pressure differential with the alarm threshold limit and send an alert if the pressure differential is above the alarm threshold limit.

7 Claims, 4 Drawing Sheets

(56) References Cited

U.S. PATENT DOCUMENTS

| | | | |
|---|---|---|---|
| 4,651,670 A * | 3/1987 | Silverwater | G01L 19/12 |
| | | | 116/267 |
| 5,672,050 A * | 9/1997 | Webber | F04B 49/022 |
| | | | 417/18 |
| 6,632,072 B2 * | 10/2003 | Lipscomb | F04D 15/0218 |
| | | | 417/12 |
| 6,676,382 B2 * | 1/2004 | Leighton | F04D 29/2222 |
| | | | 417/12 |
| 7,755,318 B1 | 7/2010 | Panosh | |
| 8,043,069 B2 | 10/2011 | Bialick et al. | |
| 9,383,244 B2 | 7/2016 | Bishop et al. | |
| 2004/0011127 A1 * | 1/2004 | Huemer | F04B 51/00 |
| | | | 73/302 |
| 2007/0147190 A1 | 6/2007 | Mons | |
| 2009/0123295 A1 * | 5/2009 | Abbott | F04D 15/0218 |
| | | | 417/36 |
| 2009/0123296 A1 * | 5/2009 | Bialick | F04B 49/04 |
| | | | 417/36 |
| 2013/0201316 A1 | 8/2013 | Binder et al. | |
| 2014/0119946 A1 | 5/2014 | Boese et al. | |
| 2014/0119947 A1 | 5/2014 | Bishop et al. | |
| 2014/0119950 A1 * | 5/2014 | Bishop | G01F 23/14 |
| | | | 417/53 |
| 2014/0199180 A1 * | 7/2014 | Schoendorff | F04B 51/00 |
| | | | 417/53 |
| 2015/0143897 A1 | 5/2015 | Cummings | |
| 2015/0355254 A1 * | 12/2015 | Rothbart | G01R 31/02 |
| | | | 417/63 |
| 2016/0201665 A1 * | 7/2016 | Hirata | F04B 41/06 |
| | | | 417/278 |
| 2017/0260977 A1 * | 9/2017 | Binks | F04B 1/053 |
| 2017/0292513 A1 * | 10/2017 | Haddad | E21B 41/0092 |

\* cited by examiner

SUMP PUMP TRACKING DEVICE

CROSS-REFERENCE TO RELATED APPLICATIONS

This application incorporates by reference and claims the benefit of priority to U.S. Provisional Application No. 62/363,027 filed on Jul. 15, 2016.

BACKGROUND OF THE INVENTION

The present subject matter relates generally to a device and system for tracking usage of a sump pump and the water level within the sump basin.

Depending on the terrain surrounding a building, rain or water from another source may infiltrate into the lower levels of a building through the foundation. Water may seep through joints between the floor and walls of the foundation, foundation cracks, small cavities around steel reinforcement, or any other small opening in the foundation. Infiltration may become problematic only during heavy rain events or, in some cases, may be a relatively consistent issue due to deteriorated foundation below a water table. Removal of water is necessary to maintain the structural integrity of the foundation as well as to minimize the growth of mold, which could damage property and lead to poor air quality.

To collect infiltration, a building may include a sump pit at the lowest elevation of the basement. Referring to FIG. 1, a sump pump 100 positioned within the sump pit or sump basin 102 includes a drainage pipe 104 to direct water away from the building. The sump pump 100 includes a water level sensor float switch 106 that is triggered when the water level sensor is activated. Water is pumped to an area away from the house, such as a municipal stormwater drain.

Under normal circumstances, water accumulates in the sump pit 102 without the owner's knowledge because the sump pit 102 is often located in a position far from the living area of the home and typically includes a circular lid 108 affixed to the top of the sump pit 102 level with the floor. Because the sump pump 100 is activated by a float switch 106, the owner may not be aware that the sump pump 100 has been turned on and is removing water from the sump pit. As a result, when there is sump pump failure (e.g., the pump has become unplugged or otherwise lost power, the backup battery has died, the mechanical float switch fails, the pump has diminished capacity, the water inflow is in excess of pump's capacity, etc.), the owner may not be aware of the failure until after the lowest level of the home is flooded.

In addition, in current systems, the owner is not provided with information useful to assess the function of the sump pump system. There is no practical solution for an owner to know when a sump pump is nearing the end of its life cycle and has reduced capacity, the discharge pipe is partially blocked, or there is some other performance reduction in the system.

Accordingly, there is a need for a device that monitors a water level in a sump pit to ensure that a sump pump is working properly and further creates a historical log of the water level.

BRIEF SUMMARY OF THE INVENTION

To meet the needs described above and others, the present disclosure provides a sump pump tracking device and system that monitors the water elevation in a sump pit and triggers an alarm if the water level reaches an alarm elevation. The alarm threshold elevation is set at a point higher than the water level sensor of the sump pump. Triggering of the alarm of the sump pump tracking device indicates that the sump pump is failing to remove water from the sump pit at an appropriate rate and action is required before the water level breaches the sump pit. In one embodiment, the alarm is triggered to allow sufficient time for the owner to take action and prevent an overflow of the sump pit.

The sump pump tracking device includes a processor programmed with computer executable instructions that calculate a pressure differential between first and second ports. The first port is open to atmospheric conditions outside of the sump pit at the height of the sensor. A tube extending from the second port into the sump pit allows the second port to measure the pressure at an elevation within the sump pit adjacent to the sump pump. The sump pump tracking device may include an air pump that injects air into the tube on a periodic basis to force out excess water within the tube.

As the water level in the sump pit rises, the water level in the tube of the second port also rises, thus increasing the air pressure in the tube. The processor converts the air pressure reading to kPa, which determines the water level within the sump pit. The sump pump tracking device is in communication with a remote server which is configured to be programmed to trigger an alarm when the water level exceeds an alarm threshold elevation.

In one embodiment, the server may also be programmed to record water level readings at intervals. The intervals may be 15 seconds, 30 seconds, one hour, or any other period of time.

The device may include a database and/or may be connected to wireless services such as data logging and alert notification via text message, email, telephone call, smartphone alert, etc. In a further embodiment, the device communicates with a remote database and other cloud-based services wirelessly over the Internet. A user may access data in the database from an electronic device, such as a computer, tablet, smartphone, etc.

An object of the invention is to monitor water levels within a sump pit.

An advantage of the invention is to ensure that the sump pump is removing water from the sump pit as expected or needed.

Another advantage of the invention is collecting historical information related to water infiltration and/or sump pump usage that may be used for many purposes, including the failure risk assessment and other performance variables in the system.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly described herein.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE INVENTION

Figure 1:
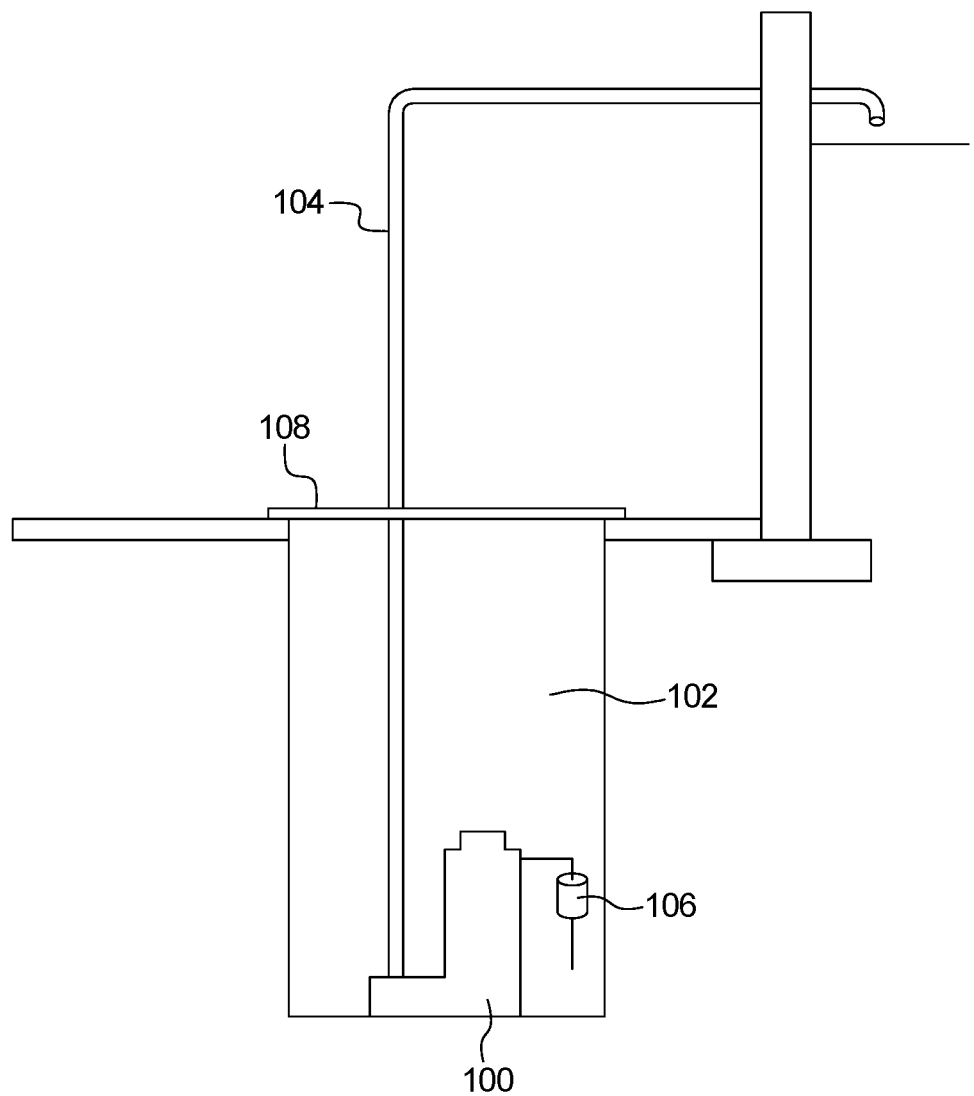
FIG. 1 is a schematic diagram of a sump pump in a sump pit of a building as is known in the prior art.
Figure 2:
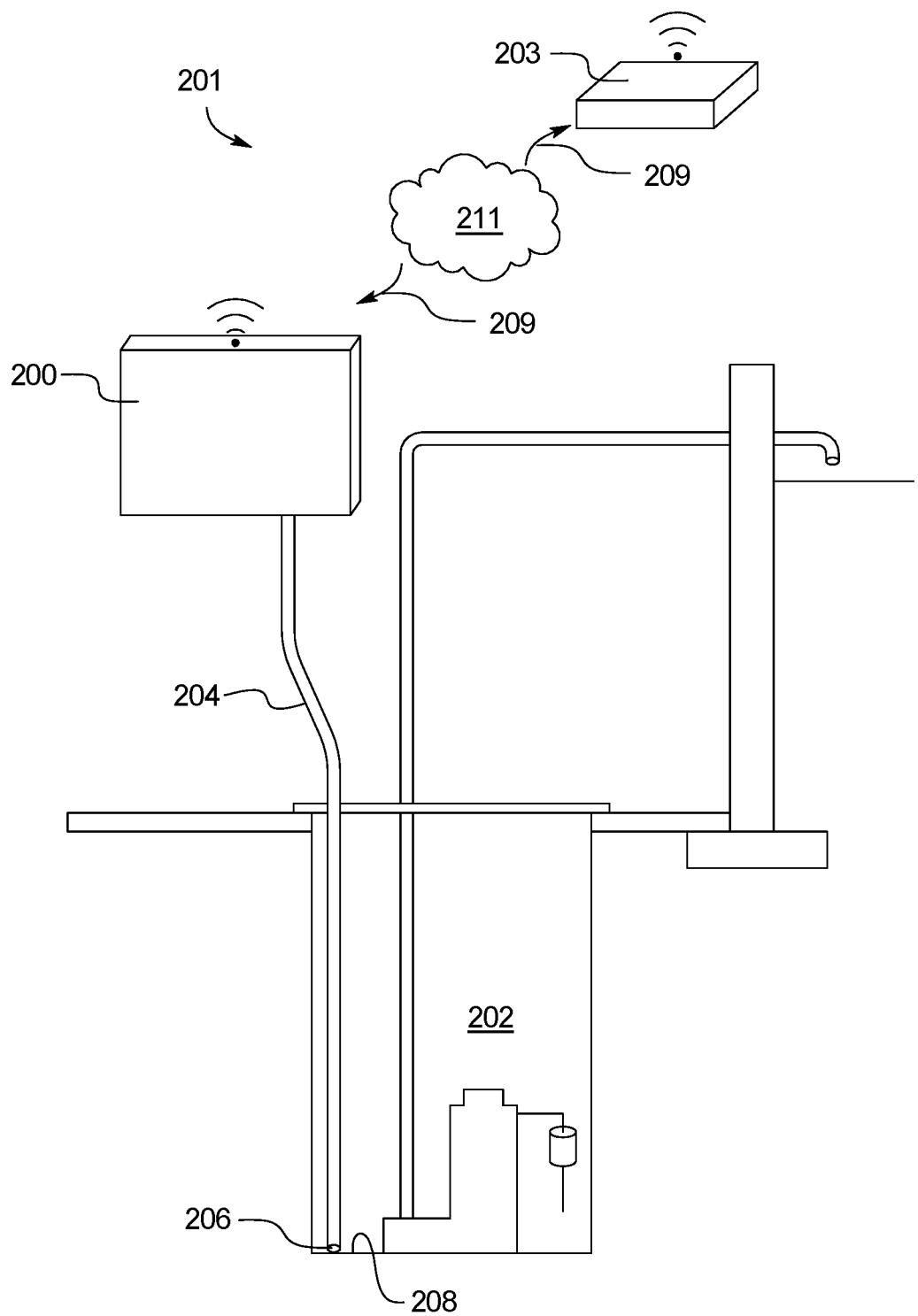
FIG. 2 is a schematic diagram of an embodiment of a sump pump tracking device of the present application within a sump pit.
Figure 3:
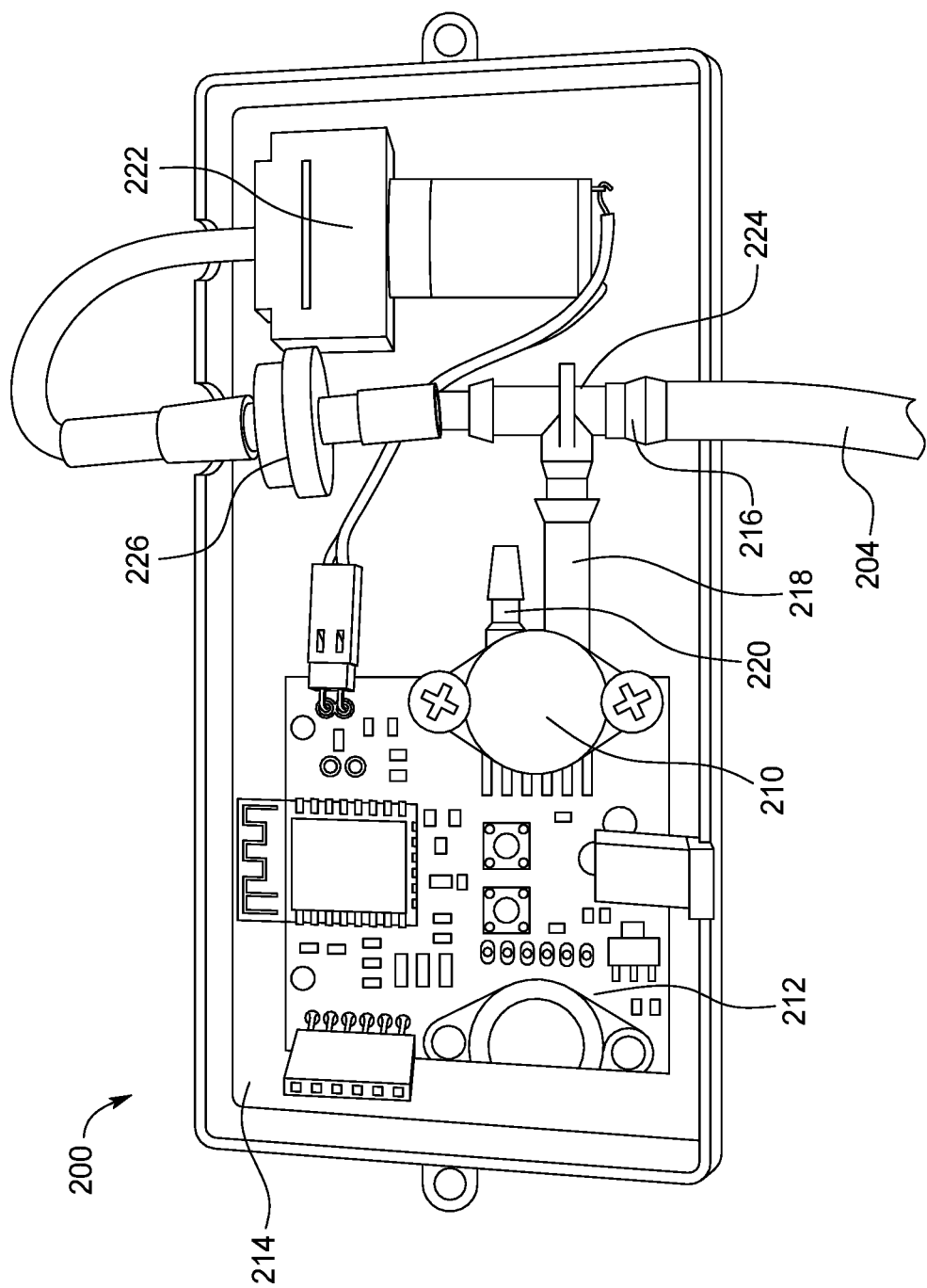
FIG. 3 is an elevational view of an interior of the sump pump tracking device of FIG. 2.

FIGS. 2 and 3 illustrate a sump pump tracking device 200. As shown in FIG. 2, the sump pump tracking device 200 is positioned outside and adjacent to a sump pit or sump basin 202. A tube 204 extends from the sump pump tracking device 300 into the sump pit 303 so that a first end 206 of the tube 204 is positioned near the bottom 208 of the sump pit 202. The tube 204 may be comprised of a vinyl or another suitable water-resistant material. In one embodiment, the sump pump tracking system 201 includes the sump pump tracking device 200 and a remote server 203. Wired or wireless communication links 209 may relay communication across a network 211 such as the internet.

Referring to FIG. 3, the sump pump tracking device 200 includes a pressure sensor 210 in communication with a processor 212 within a housing 214. A second end 216 of the tube 204 connects to a first port 218 of the pressure sensor 210. A second port 220 of the pressure sensor 210 is open to atmospheric conditions. The processor 212 is programmed with computer executable instructions to calculate a pressure differential between first and second ports 218, 220. One example of a suitable pressure sensor is the Board Mount Pressure Sensor MPX5010DP by Freescale, although other differential pressure sensors may be used.

During use, water accumulates within the sump pit 202 such that the water level in the tube 204 rises as the water level in the sump pit 202 rises. The processor 212 calculates the water level within the sump pit 202 based on the dimensions of the sump pit 202 and the air pressure measured via the first port 218.

Also shown in FIG. 3, the sump pump tracking device 200 may include an air pump 222 that injects air into the tube 204 on a periodic basis to expel excess water from the tube 204. In this embodiment, the tube 204 and the air pump 222 are connected to the pressure sensor 210 through a t-valve 224. A one-way valve 226 may be positioned between the air pump 222 and the t-valve 224 to ensure that air flows away from the air pump 222.

Figure 4:
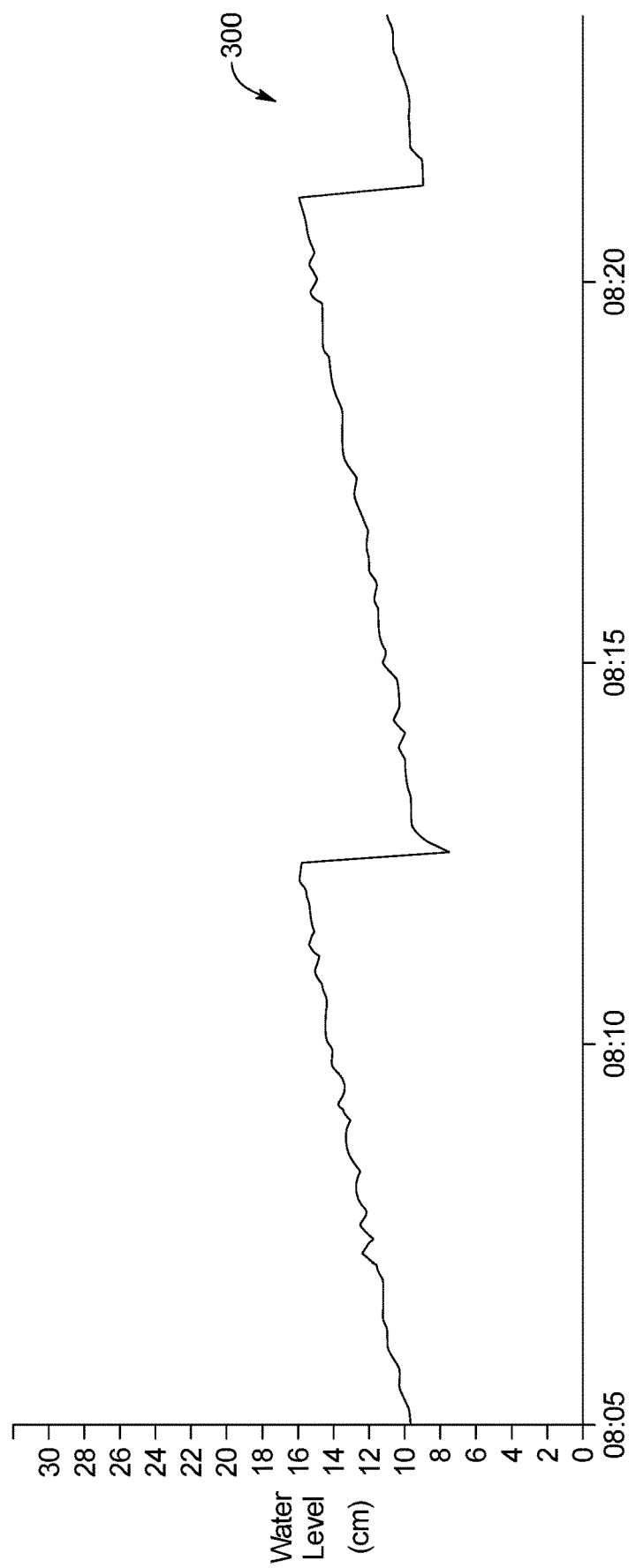
FIG. 4 is a graph illustrating water level elevation changes over time as monitored by the sump pump tracking device of FIG. 1.

Operation of the sump pump tracking device 200 is controlled through a web-based software as a service (SaaS) platform or a mobile application downloaded to a mobile device. In one embodiment of the sump pump tracking system, the pressure sensor 210 is in communication with a remote server 203 that receives the pressure sensor readings, records the pressure sensor readings at specified intervals, and provides data to users upon request. In some embodiments, the processor 212 may record water level readings at timed intervals, such as 15 seconds, 30 seconds, one hour, or any other period of time as desired. The graph 300 of FIG. 4 illustrates the change in water level elevation over time. The sharp change in elevations as shown in the graph 300 indicate that the sump pump is triggered when the water level reaches 16 cm. The user may obtain data and information through the web-based SaaS platform or the mobile application.

The user may also program one or more alarm threshold elevations via the web-based SaaS platform or the mobile application. The server 203 will compare the pressure sensor readings with pre-programmed alarm threshold elevation and trigger an alarm when the water level in the sump pit 202 exceeds an alarm threshold elevation. The user may specify one or more alarm threshold elevations that correspond to different levels of emergency. For example, first, second, and third alarm threshold elevations may correspond to a low-level warning, a mid-level warning, and a high alert.

The sump pump tracking device 200 may include a database and/or may be connected to wireless services such as data logging and alert notification. For example, the sump pump tracking device 200 may send alerts via text message or email to users. In a further embodiment, the sump pump tracking device 200 communicates with a database and other cloud-based services wirelessly over the internet. A user may access data in the database from an electronic device, such as a computer, tablet, smartphone, etc.

It should be noted that various changes and modifications to the presently preferred embodiments described herein will be apparent to those skilled in the art. Such changes and modifications may be made without departing from the spirit and scope of the present invention and without diminishing its attendant advantages.

I claim:

1. A sump pump tracking system comprising:
   a pressure sensor including a first port and a second port;
   a tube extending from the first port;
   an air pump in fluid communication with the tube and positioned adjacent to the pressure sensor;
   a processor in communication with the pressure sensor;
   a remote server in communication with the pressure sensor; and
   a memory in communication with the processor, the memory including instructions, that when executed by the processor, cause the processor to:
   receive an air pressure reading from the first port; and
   determine the pressure differential between the first port and the second port;
   wherein the server is configured to be programmed with an alarm threshold limit;
   wherein the pressure sensor communicates the pressure differentials to the server; and
   wherein the server is configured to compare the pressure differential with the alarm threshold limit and send an alert if the pressure differential is above the alarm threshold limit.

2. The sump pump tracking system of claim 1, further comprising a one-way valve between the air pump and the tube.

3. The sump pump tracking system of claim 1, further comprising a database, wherein the remote server receives a plurality of pressure differentials, each pressure differential associated with a time stamp, and communicates the plurality of pressure differentials on the database to be stored remotely.

4. The sump pump tracking system of claim 1, wherein the remote server is configured to be programmed with a plurality of alarm threshold limits, each alarm threshold limit associated with one of a plurality of alarm levels, and wherein the remote server compares the pressure differential with the plurality of alarm threshold limits and sends an alarm corresponding to the alarm level of the highest alarm threshold limit exceeded by the pressure differential.

5. A sump pump tracking system comprising:
   a housing including a pressure sensor and a processor;

a tube extending from the pressure sensor;

an air pump in fluid communication with the tube and positioned adjacent to the pressure sensor; and a system server configured to be programmed with an alarm threshold limit and adapted to receive a pressure sensor reading from the pressure sensor and to communicate an alert if the pressure sensor reading is above the alarm threshold limit.

6. The sump pump tracking system of claim 5, wherein the system server is configured to receive a plurality of pressure sensor readings from the pressure sensor and to provide data upon request.

7. The sump pump tracking system of claim 5, further comprising:

a one-way valve between the air pump and the tube.

* * * * *